United States Patent [19]

Richardson, Jr.

[11] Patent Number: 4,781,268
[45] Date of Patent: Nov. 1, 1988

[54] STEERING COLUMN SHIELD

[76] Inventor: Winaford H. Richardson, Jr., 2511 Wedglea, #823, Dallas, Tex. 75211

[21] Appl. No.: 142,924

[22] Filed: Jan. 12, 1988

Related U.S. Application Data

[63] Continuation of Ser. No. 028,217, Mar. 26, 1987, Pat. No. 4,719,986.

[51] Int. Cl.⁴ ............................................. B60R 25/02
[52] U.S. Cl. ..................................... 180/287; 70/237; 70/417; 280/779
[58] Field of Search .................. 180/287; 70/237, 417; 280/779

[56] References Cited

U.S. PATENT DOCUMENTS

| | | | |
|---|---|---|---|
| 4,098,102 | 7/1978 | Kalina | 70/237 |
| 4,104,895 | 8/1978 | Tankel | 70/237 |
| 4,123,924 | 11/1978 | Dworkis | 70/237 |
| 4,167,222 | 9/1979 | El Bindari | 70/237 |
| 4,494,391 | 1/1985 | Solow | 70/237 |
| 4,505,140 | 3/1985 | Solow | 70/237 |
| 4,598,562 | 7/1986 | Freeman | 70/237 |
| 4,627,514 | 12/1986 | Brown | 180/287 |

*Primary Examiner*—Kenneth R. Rice
*Attorney, Agent, or Firm*—Daniel V. Thompson

[57] ABSTRACT

An apparatus for preventing the unauthorized use of a vehicle. The apparatus includes main column unit half shells and column base unit half shells having interlocking joint structure for fixing the main column unit and base column unit to a steering column unit. Locking means is provided to lock the main column unit to the steering column once they are affixed thereto.

4 Claims, 2 Drawing Sheets

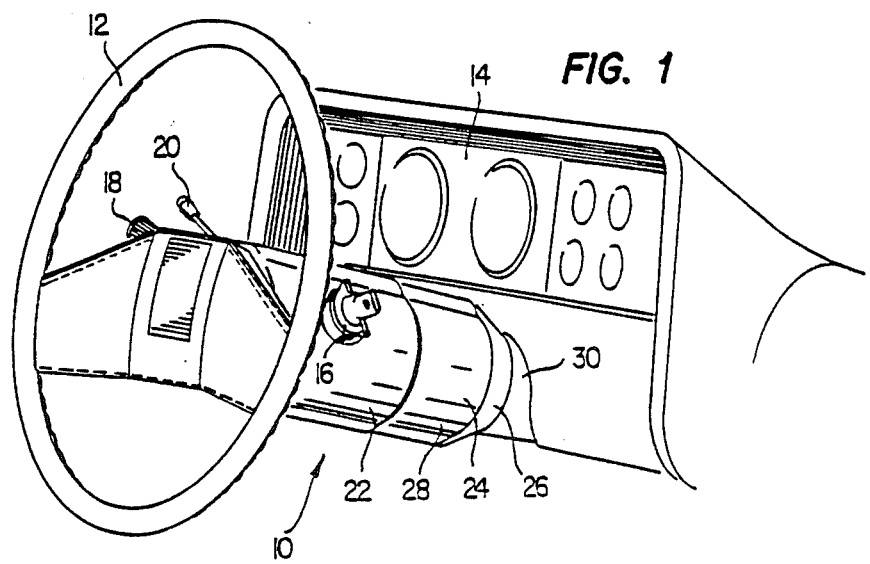
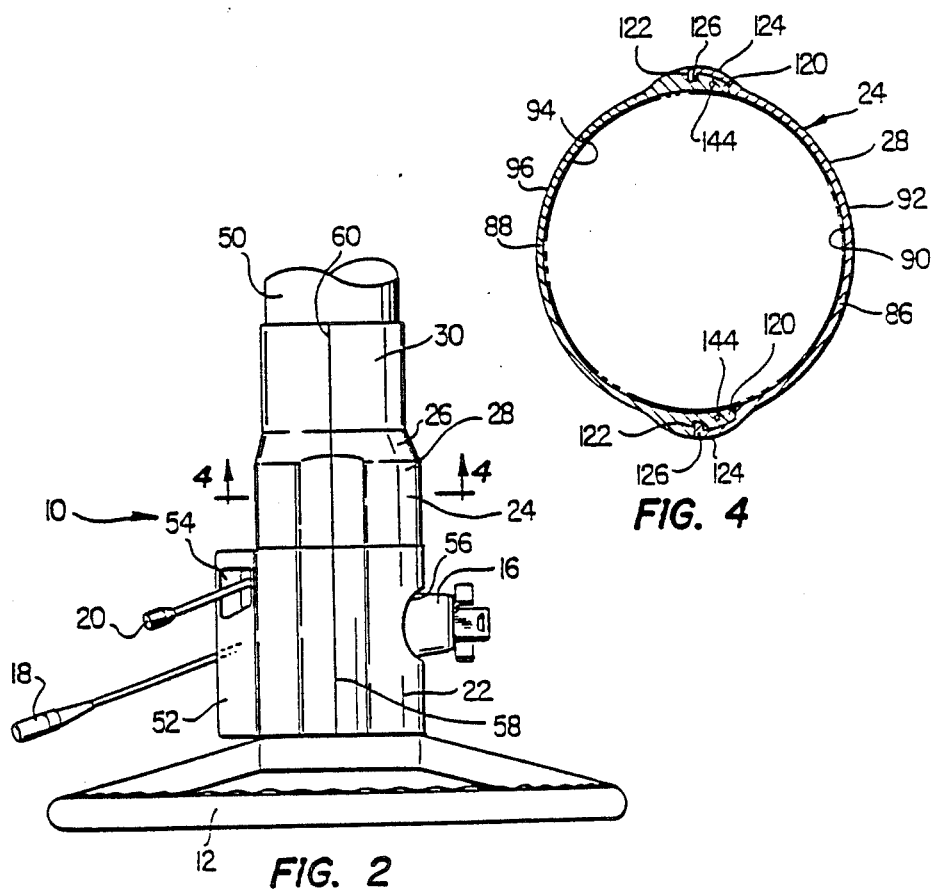

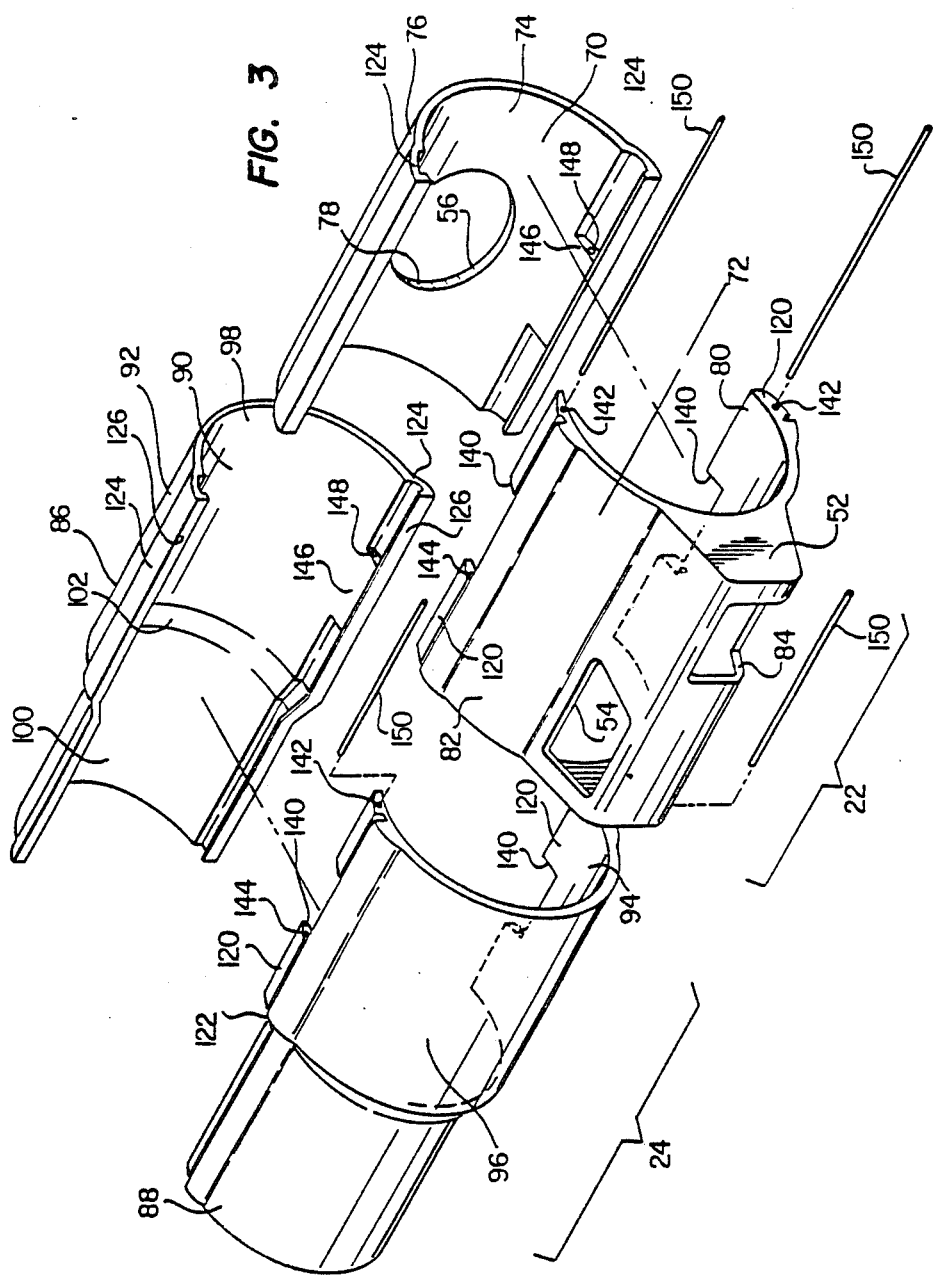

STEERING COLUMN SHIELD

CROSS-REFERENCE

This is a continuation of application Ser. No. 07/028,217 filed Mar. 26, 1987, now U.S. Pat. No. 4,719,986.

FIELD OF THE INVENTION

This invention relates to devices for preventing the unauthorized use of a vehicle, and more particularly to a shield for protecting the steering column of a vehicle from breakage by an unauthorized user.

DESCRIPTION OF THE PRIOR ART

In recent years automotive manufacturers have adopted many design techniques for reducing the weight and thereby increasing the fuel economy of vehicles. The basic trend of these improvements has been to substitute plastic parts for parts that were previously made of metal. In many areas of the vehicle, these substitutions and redesigns have effectively met the goal of reducing the weight of the vehicle with no tradeoffs in terms of vehicle performance.

One area, however, where the trend to lightweight plastic parts has had an unexpected detrimental effect has been in the steering column portion of the vehicle. In modern vehicles, an ignition lock and steering wheel lock are incorporated into the steering column by means of a complicated mechanism. The outer cover of the steering column encloses this mechanism and prevents unauthorized users from manipulating the mechanism to unlock and start the vehicle. In recent years, the steering column outer cover, which previously was made of metal, has been manufactured from a plastic material having a very thin wall thickness. It is now commonly known among car thieves and the like that certain models of vehicles having the thin walled plastic steering column covers can be stolen by merely chipping a hole into the steering column cover at a particular area, with a screwdriver or hammer, and manipulating the locking mechanism through the hole to start and unlock the car.

The ease by which these cars may be stolen has resulted in an epidemic of stolen cars, inasmuch as no special tools or sophistication are required to very quickly defeat the locking mechanisms of the vehicles.

Thus, a need presently exists for a steering column shield that may be retrofitted to cars having the lightweight steering column covers. The shield should be user-installable without the need for special tools, yet be impossible to defeat once installed without special tools or sophistication. While such a shield would not prevent all thefts of cars, it would defeat the theft of a car using simple tools such as a screwdriver. The shield should also be unobtrusive and aesthetically integratable into the interior of the vehicle in order to encourage user acceptability.

Several steering column anti-theft devices are known in the art. U.S. Pat. No. 4,167,222 to El Bindari discloses a passive anti-theft device that includes a band that wraps around the steering column and a cylindrical portion to protect the ignition key cylinder housing. U.S. Pat. No. 4,123,924 to Dworkis discloses a cover for an ignition switch lock. U.S. Pat. No. 4,598,562 to Freeman discloses a hinged protective jacket for a steering column to be locked to the steering column by means of a padlock. U.S. Pat. No. 4,098,102 to Kalina discloses a tamper-proof lock housing for enclosing the ignition lock of an automobile. U.S. Pat. No. 4,494,391 to Solow discloses a chain operated security cover for an ignition lock. U.S. Pat. No. 4,505,140 to Solow also discloses a chain operated ignition lock cover. Finally, U.S. Pat. No. 4,104,895 to Tankel discloses a protective cover for the ignition lock of a vehicle having a pivotally attached shackle.

None of the prior art devices has solved the problem of providing full protection for modern steering column covers in an aesthetically pleasing, economical to manufacture and easy to install manner.

SUMMARY OF THE INVENTION

The present invention provides a permanently installed steering column shield which guards the ignition and steering wheel lock components located within the steering column from unauthorized access and manipulation. The invention includes a main column unit having two half shells with openings for access to the ignition and control levers of the steering column. The half shells include specially adapted interlocking joint structure on the edges of the shells for fixing the shells to the steering column with a continuous seam on top and bottom. Non-removable headless drive screws extend through aligned holes in the half shells to lock the shells together after assembly. A similar base column unit may also be used to protect the lower portion of the steering column.

BRIEF DESCRIPTION OF THE DRAWINGS

A more complete understanding of the invention and its advantages will be apparent from the Detailed Description taken in conjunction with the Drawings in which:

FIG. 1 is a perspective view of a steering column to which a shield of the present invention is fixed;

FIG. 2 is an overhead view of the steering column and shield of FIG. 1;

FIG. 3 is an exploded perspective view of the steering column shield of the present invention; and, FIG. 4 is a sectional view taken along lines 4-4 of FIG. 2.

DETAILED DESCRIPTION OF THE PREFERRED EMBODIMENT

Referring initially to FIG. 1, steering column shield 10 is fixed about a steering column of a vehicle including steering wheel 12 and instrument panel 14. Ignition lock 16 extends through an opening in steering column shield 10, as do control levers 18 and 20. Steering column shield 10 includes main column unit 22 and base column unit 24. Base column unit 24 includes a frustoconical portion 26 which joins a larger diameter portion 28 and a smaller diameter portion 30. Small diameter portion 30 extends below instrument panel 14 and terminates at a position not shown in FIG. 1.

Referring now to FIG. 2, steering column 50 extends from column base unit 24 and is connected to the vehicle in conventional fashion. Control lever 18 typically operates the turn signals of the vehicle, and control lever 20 typically operates the tilt mechanism for the steering wheel assembly. Main column unit includes lever pocket 52 wherein opening 54 is provided for control lever 20 and another opening (not shown) is provided for control lever 18. Opening 56 is provided for ignition lock 16. When steering column shield 10 is fixed to steering column 50, seam 58 of main column unit 22 and seam 60 of base column unit 24 are visible, but the manner in which the main column unit and column base unit are fixed to the steering column is not readily apparent.

Referring now to FIG. 3, main column unit 22 is comprised of first main column unit half shell 70 and second main column unit half shell 72. First main column unit half shell 70 has inner and outer semi-cylindrical surfaces 74 and 76, respectively, extending substantially along the length thereof. Cylindrical walls 78 define opening 56 for the ignition lock. Second main column unit half shell 72 includes partial semicylindrical inner and outer surfaces 80 and 82, respectively, and lever pocket 52 extends from outer surface 82. Walls disposed in lever pocket 52 define opening 54 adapted for a tilt control lever and opening 84 adapted for a turn signal control lever.

In similar fashion, the column base unit includes first column base unit half shell 86 and second column base unit half shell 88. First column base unit half shell 86 includes inner and outer semi-cylindrical surfaces 90 and 92, respectively, extending substantially along the length thereof. Second column base unit half shell 88 includes inner and outer semi-cylindrical surfaces 94 and 96, respectively, extending substantially along the length thereof. Inner surface 90 includes larger diameter portion 98 and smaller diameter portion 100 joined by frustroconical portion 102. Similarly, inner surface 94 includes a large diameter portion and smaller diameter portion joined by a frustro-conical portion.

Referring now to FIG. 4 in addition to FIG. 3, the joint structure for the larger diameter portion of column base unit 24 will be described, which is typical of the joint structure of the other portions of column base unit 24 as well as main column unit 22. The joint structure includes underlying portions 120 on second base column unit half shell 88. Underlying portions 120 have grooves 122 extending substantially along the entire length thereof. First column base unit half shell 86 includes overlying portions 124 having ridges 126 extending substantially along the length thereof. In the preferred embodiment, the column base unit half shells and main column unit half shells are constructed of a flexible material, such that the column base unit and main column unit may be fixed to the steering column by pushing the half shells together around the steering column and flexing the overlying portions 124 over the underlying portions 122 until ridges 126 snap into engagement with grooves 122. In the preferred embodiment, no tools are necessary for affixing the column base unit and main column unit to the steering column.

The main column unit and column base unit must be locked in place to prevent unauthorized removal and access to the vulnerable portions of the steering column. Still referring to FIGS. 3 and 4, each underlying portion 120 includes a notch 140 in the medial portion thereof and cylindrical walls 142 and 144 defining aligned and opposing elongated holes in underlying portions 120. Similarly, overlying portions 124 include members 146 sized for engagement with notches 140 and having cylindrical walls 148 defining elongated holes aligned with the holes defined by cylindrical walls 142 and 144 when the main column unit half shells and column base unit half shells are engaged about the steering column. Pins 150 engage the elongated holes in the underlying portions 120 and overlying portions 124 when the main column unit half shells and column base unit half shells are fixed to the steering column. In the preferred embodiment, pins 150 are counter-sunk, non-removable headless drive screws that cannot be removed from the elongated holes once they are installed.

In operation, the steering column shield of the present invention provides a theft-deterrent system by covering the vulnerable portions of vehicle steering columns with a tough and impact resistant surface. To install the steering column shield of the present invention, the column base unit must be installed first, because access to the elongated holes in the column base unit half shells is available only before the main column unit is installed. Once the column base unit is installed and locked in position, the main column unit half shells are installed and the pins are driven into the elongated holes thereof.

Whereas the present invention has been described with respect to a specific embodiment thereof, it will be understood that various changes and modifications will be suggested to one skilled in the art, and it is intended to encompass such changes and modifications as fall within the scope of the appended claims.

I claim:

1. Apparatus for preventing the unauthorized use of a vehicle having an ignition lock and at least one control lever mounted in a steering column, comprising:

a main column unit including first and second main column unit half shells;

the first main column unit half shell having semi-cylindrical inner and outer surfaces extending substantially along the length thereof and walls defining an opening for the ignition lock of the vehicle;

the second main column unit half shell having partial semi-cylindrical inner and outer surfaces and a lever pocket extending from the outer surface thereof, the lever pocket including walls defining at least one opening for the control lever of the vehicle;

main column unit interlocking joint means disposed on side edges of the first and second main column unit half shells for fixing the main column unit about the steering column in the vicinity of the ignition lock and control lever; and main column unit locking means acting in cooperation with the main column unit interlocking joint means for preventing the removal of the main column unit once it is fixed about the steering column.

2. The apparatus of claim 1 wherein the lever pocket has two ends and includes walls defining an opening for a turn signal control lever located adjacent one end of the lever pocket and walls defining an opening for a tilt control lever located adjacent the other end of the lever pocket.

3. The apparatus of claim 1 wherein the main column unit locking means comprises a first cylindrical wall in the first main column unit half shell defining a first elongated hole therein, a second cylindrical wall in the second column unit half shell defining a second elongated hole therein aligned with the first elongated hole when the main column unit is fixed to the steering column, and pin means for engaging the first and second elongated holes.

4. The apparatus of claim 3 wherein the pin means comprises a non-removable headless drive screw.

* * * * *